Figure 1:
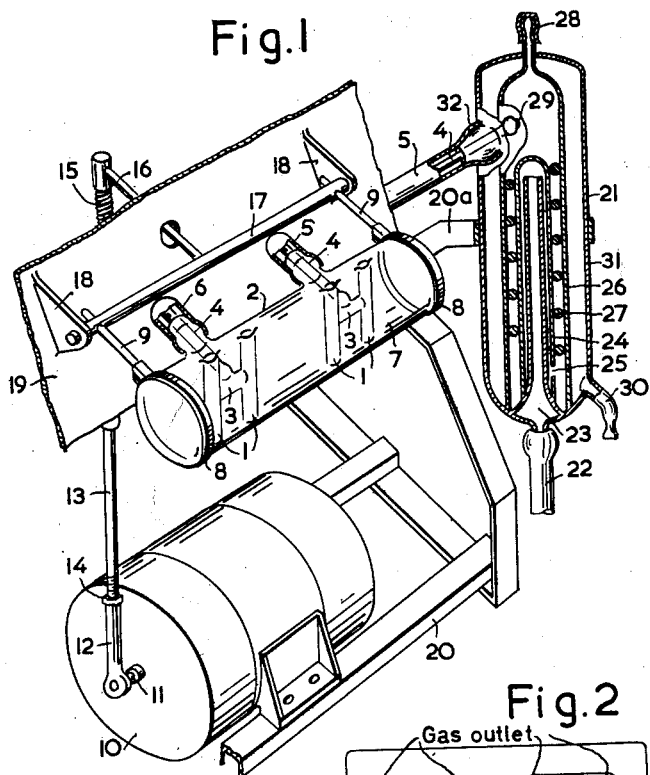

March 31, 1964     P. ASTRUP ETAL     3,127,254
METHOD FOR THE EQUILIBRATION OF A SMALL AMOUNT OF LIQUID
AND APPARATUS FOR CARRING OUT THE METHOD
Filed June 27, 1960

United States Patent Office 3,127,254
Patented Mar. 31, 1964

3,127,254
METHOD FOR THE EQUILIBRATION OF A SMALL AMOUNT OF LIQUID AND APPARATUS FOR CARRYING OUT THE METHOD
Poul Astrup, Holte, Ole Siggaard-Andersen, Copenhagen, Kjeld Jørgensen, Copenhagen-Bronshoj, and Knud Engel, Copenhagen, Denmark, assignors to Radiometer V.B. Aagaard Nielsen & C. Schroder, Copenhagen, Denmark, a firm
Filed June 27, 1960, Ser. No. 39,027
Claims priority, application Denmark July 4, 1959
15 Claims. (Cl. 55—68)

The present invention relates to a method for the equilibration of a small amount of liquid, preferably not exceeding the magnitude 100 μl. and a gas. Further, the invention relates to an apparatus for carrying out the said method.

Between a liquid and a gas being in contact with each other, an equilibrium will in time occur. According to Henry's law the contents of a physically dissolved gas in a liquid are proportional to the partial pressure of said gas above the liquid. If the partial pressure above the liquid increases, the liquid will absorb more of the gas, and if the partial pressure decreases, the liquid will liberate part of the gas absorbed.

Within analytic chemistry, this feature can be used for determining the partial pressure of a given gas if the composition of the liquid is known, or for characterizing the liquid if the partial pressure of a given gas is known.

The method according to which a state of equilibrium between a liquid and a gas having a definite partial pressure is obtained, is here called equilibration.

A previously used method for obtaining such equilibration is based on the principle of forcing the gas through the liquid in the form of bubbles.

Equipment for effecting equilibration according to this principle is well known. In its simplest construction, the equipment consists of a glass chamber, in the bottom of which the gas inlet is effected. The gas supplied to such equipment will in the form of greater or smaller gas bubbles, ascend through the liquid. It is common to place a glass frit at the bottom of the chamber in the result that during its travel through the frit, the gas is finely divided into tiny gas bubbles. In so doing, the time of equilibration is considerably reduced.

Such method of equilibration is, however, not appropriate in every case. Thus, an important field within which the method is non-applicable is for the equilibration of whole blood in small amounts, e.g., for the determination of $pCO_2$ in blood, as it has proved that by such bubbling-through method it is not possible to avoid hemolysis of the blood. Consequently, only blood plasma has previously been used for the equilibration of blood.

The present invention has for its object to provide a method of equilibration and an apparatus being applicable for the equilibration of small amounts of liquid also in such cases where the bubbling-through method has proved non-applicable.

This is attained by a method which according to the invention is characterized in that by vibration the liquid is caused to distribute in the form of a thin film on the surface of a thermo-statted wall of a container and is in this state exposed to a thermostatted flow of said gas being saturated at the temperature used with the solvent or dispersion medium of the liquid.

On account of the large surface of contact between the liquid and the gas, a very quick and effective equilibration is obtained by said method. Furthermore when stopping the vibration, a very quick collection of the small amount of liquid used will take place with the consequential possibility of quickly taking measurements, e.g. pH measurements, on the liquid after termination of the equilibration.

This heretofore unknown method of equilibration has proved so effective that, e.g. used on blood, it makes it possible to effect equilibration of whole blood without the heretofore occurring hemolysis of the blood. According to a preferred embodiment of the present method, whole blood is, therefore, used for the equilibration, preferably in an amount not exceeding 40–50 μl.

In connection with the equilibration of blood, a particular interest is attached to the determination of $pCO_2$ of blood, as certain disturbances in the organism manifest themselves either in a too high or in a too low $pCO_2$ in the blood. Such a determination of $pCO_2$ in blood by using the present method of equilibration may be based on the recognition that there is a linear dependency between the pH-value of blood and log $pCO_2$. Thus, there is either the possibility, by effecting equilibration with two different $CO_2$-concentrations using e.g. two different $CO_2/O_2$ mixtures, to determine the said linear dependency whereupon the $pCO_2$ of the blood can be determined on the basis of the knowledge of its pH value, or the possibility of determining the linear dependency on the basis of a single determination based on equilibration according to the present invention and knowledge of the slope of the dependency based on measurement of the hemoglobin content of the blood, since it has proved that to a certain content of hemoglobin corresponds a certain slope of the linear dependency between log $pCO_2$ of blood and its pH value.

In view of this important field of application of the present method, there is, consequently, for the equilibration of whole blood according to the invention, preferably used a mixture consisting of carbon dioxide and oxygen.

When using the present method of equilibration for equilibrating blood, the solvent or dispersion medium of the liquid is water, and the gas used for the equilibration should, consequently, as mentioned above be saturated with water vapour to prevent water from passing to or away from the blood during the equilibration. However, there is also the possibility of using the present method of equilibration for testing liquids with a solvent or dispersion medium other than water, e.g. ethanol, in which case the gas used for the equilibration should be saturated with ethanol.

The apparatus according to the invention for carrying through the above method of equilibration is of the type comprising an equilibration unit having one or more chambers for receiving liquid, while the characteristic of the apparatus according to the invention resides in the apparatus having means for putting each chamber into a such, preferably vibrating, motion that the small amount of liquid, preferably of the magnitude 100 μl., contained in the chamber, will by the motion of the chamber be distributed in the form of a film on the wall of the chamber, and means for thermostatting each chamber, and means for introducing and taking-out a thermostatted gas through each chamber.

The chambers may be of any shape permitting a quick and easy distribution of the liquid on the chamber wall by the motion of the chamber, and permitting easy introduction of measuring instruments into the liquid drop formed after equilibration, e.g. a micro electrode for pH measurements. These requirements are in an excellent manner fulfilled by forming according to the invention the chambers of glass tubes closed at one end and fused into a thermostat jacket, preferably of glass.

The equilibration unit needs only contain a single chamber for receiving liquid but both with regard to control and to permitting the treatment of different liquids simultaneously, it is according to the invention expedient that the equilibration apparatus is adapted for the simultaneous equilibration of a plurality of samples with the same gas.

For two chambers this can according to the invention expediently be provided in the manner that the gas inlet opens into a cross-branch connecting and opening into said two chambers.

It is likewise rational, e.g. with a view to the above equilibration of two samples of the same blood with two different $CO_2$-tensions, and consequently preferred according to the invention to arrange the equilibration apparatus for the simultaneous equilibration with different gases.

The thermosetting being required for the chambers of the equilibration unit and the gas supplied, respectively, is expediently provided with water of desired temperature and, consequently, the present apparatus is according to the invention expediently provided with means for thermostatting by the passage of water. In case that the equibration unit is arranged for the simultaneous equilibration with different gases, the apparatus according to the invention is expediently arranged for the introduction of thermostat water round the inlet of one gas and for the discharge of thermostat water round the inlet of the second gas.

As mentioned above, the gas used for the equilibration should be saturated with the solvent or dispersion medium of the liquid used for the equilibration. For this purpose, the equilibration apparatus is according to the invention in communication with one or more thermostatted humidifiers for saturation a gas with a liquid.

The motion of the chambers required for the film-formed liquid distribution in the equilibration chambers used, can be provided in many different ways, and there is e.g. both the possibility of moving the chambers within an equilibration unit being otherwise at rest, and of moving the whole equilibration unit. The latter method must e.g. be used where the chambers, as mentioned above, are sealed into the equilibration unit. An embodiment, expedient according to the invention, of an apparatus where the entire equilibration unit is moved is characterised in that the means for causing the motion of the chambers comprise a motor, the rotary motion of which being through a connecting rod and a lever attached thereto converted into an oscillatory movement of the suspension pin of the equilibration unit.

Since the amount of liquid used can vary to some extent, it is according to the invention expedient that the apparatus has means for adjusting the amplitude of the oscillations of the chambers.

Figure 2:
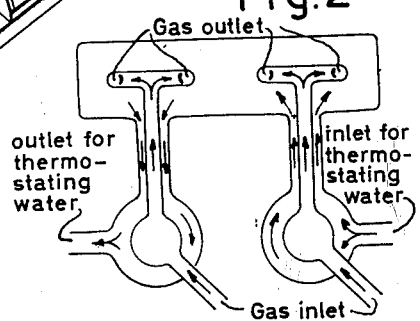

In the following the invention will be described with reference to the accompanying drawing, in which FIG. 1 illustrates an embodiment of the apparatus according to the invention, and FIG. 2 illustrates diagrammaticaly the flow of gas and thermostat water through the humidifiers and the equilibration unit shown in FIG. 1.

With reference to FIG. 1, 10 designates a motor mounted on a frame construction 20. The rotation of this motor is via an eccentric 11, an arm 12, a rod 13 being attached to this arm by means of an adjustable nut 14, a resilient connection 15 and a lever 16 transmitted to a shaft 17 to which an equilibration unit 7 is attached by means of suspending rings 8 attached to each end of the equilibration unit, and arms 9 secured partly to the said suspending rings 8 and partly to the shaft 17. The shaft 17 is by means of lugs 18 secured to a wall 19 being mounted upon the frame constructions 20. The equilibration unit is thereby brought to oscillate, the amplitude of said oscillations being changeable by adjustment of the arms 9. The oscillation may for instance be of the order 2500 cycles per minute.

The equilibration unit comprises four glass chambers 1 each consisting of a glass tube closed at one end. The dimensions of these glass tubes may for instance be of the order 35 mm. height and 5 mm. broad. These chambers are fused into a thermostat jacket 2 of glass, the jacket having for instance a length of 120 mm. and a diameter of 35 mm. The glass chambers 1 are pairwise interconnected by means of a glass tube 3.

The gas used for the equilibration passes through a gas inlet 22 at the bottom of a humidifier 21 being attached to the frame construction 20 by means of a bracket 20a. Within the said humidifier the gas passes upward through an inner tube 23, then downward between this tube and another tube 24 which it leaves through an opening 25, then passing upward through a space between the tube 24 and a container 26, the said space containing a leading coil 27. The container 26 is at the top thereof closed by a cap 28 being removable for filing in the liquid used for saturating the gas. The gas leaves the humidifier through a gas outlet 29 and passes through a hose 4 to the tube 3 and from here the gas will pass on to the glass chambers 1 wherein the liquid samples are placed. The rate of flow may for instance be of the order 50 ml. per minute per chamber.

The inlet of thermostat water is effected through an inlet 30 at the bottom of the humidifier 21, the thermostat water passing then upward between the container 26 and an outer jacket 31 of the humidifier and leaving the humidifier at an outlet 32, then passing through a hose 5 located round one of the hoses 4, to the equilibration unit which it leaves through a hose 6 located round the other hose 4, the water being then discharged through the outer jacket of a second humidifier similar to the above humidifier 21.

FIG. 2 shows diagrammatically the connection between the humidifier and the equilibration unit and the flow of gas and thermostat water respectively, through the said humidifiers and the equilibration unit.

Before the motor is switched on the liquid samples lie as small pools at the bottom of the glass chambers 1. When the motor is switched on, the liquid samples will form a thin film on the sides of the glass chambers 1. In the course of a few minutes the equilibration will be accomplished, and when the motor is switched off, the liquid samples will again collect in small pools at the bottom of the chambers 1. Hereafter the equilibrated samples can quickly be subjected to measurings, e.g. a pH-measuring by means of a specially designed capillary glass electrode. Hereupon, the chambers can readily be cleaned by means of a piece of cotton.

When equilibrating blood samples with $CO_2/O_2$ mixtures, thermostatting is expediently effected at 38° C., and the saturation of the gas mixture with water vapour is expediently effected by bubbling the mixture through water in a humidifier. In the case of thermostatting with water, like in the manner shown in FIG. 1, it has been possible all over the system to maintain a temperature of 38° C. ±0.2°.

Many modifications of the method described and the apparatus described will be possible without evading the scope of the invention.

What we claim is:

1. A method of equilibrating a liquid and a gas comprising introducing a small arbitrary amount of the liquid to be equilibrated into a container, maintaining said container at a predetermined temperature, vibrating said container so as to distribute at least a portion of the liquid therein as a thin film over the container wall, adjusting the temperature of the gas to the same temperature as said container, passing the gas through said container and along the exposed surface of said film of liquid so as to contact said film of liquid, and continuing the passing of said gas for a sufficient interval for the liquid to absorb a quantity of gas corresponding to the gas pressure, and then discontinuing said vibration.

2. The method of claim 1 including in addition saturating the gas with vapors of said liquid before the gas is passed through said container.

3. A method of equilibrating blood with carbon dioxide comprising introducing a small arbitrary amount of blood into a container, maintaining said container at a predetermined temperature, vibrating said container so as to distribute a thin film of blood over the container wall, mixing carbon dioxide and oxygen in such ratio as to give the resulting mixture a desired carbon dioxide partial pressure, adjusting the temperature of the resulting mixture of gas to the same temperature as the container, saturating said gas mixture with water vapour at said temperature, passing the gas mixture past said thin film of blood and through said container for a sufficient interval for the blood to absorb the amount of carbon dioxide corresponding to the carbon dioxide partial pressure, and then discontinuing the vibration of the container.

4. The method of claim 3 wherein the liquid comprises not more than about 100 μl. of whole blood.

5. An apparatus for equilibrating a small amount of liquid and a gas comprising: a container for receiving the liquid to be equilibrated with the gas, said container being provided with an inlet opening for liquid and an inlet opening and an outlet opening for the gas with which the liquid is to be equilibrated, means for maintaining the temperature of the container constant, means for adjusting the temperature of said gas to the temperature of said container, and means for vibrating said container.

6. An apparatus for equilibrating a small amount of liquid and a gas comprising: a container for receiving the liquid to be equilibrated with the gas, said container being provided with an inlet opening for liquid and an inlet opening and an outlet opening for the gas with which the liquid is to be equilibrated, a humidifier for saturating the gas with said liquid, a conduit connecting said humidifier with said container, means for maintaining the temperature of the container constant, means for adjusting the temperature of said gas to the temperature of said container and means for vibrating said container.

7. An apparatus for equilibrating a small amount of liquid and a gas comprising a vertically disposed glass tube for receiving the amount of liquid to be equilibrated, said glass tube being closed at the bottom end and open at the top end and being provided with an inlet opening for gas, said tube being fused into a jacket, means for maintaining the temperature of the walls of said glass tube at a constant temperature, means for adjusting the temperature of said gas to the temperature of said glass tube, and means for vibrating the glass tube.

8. An apparatus for equilibrating a small amount of liquid and a gas comprising a vertically disposed glass tube for receiving the amount of liquid to be equilibrated, said glass tube being closed at the bottom end and open at the top end and being provided with an inlet opening for gas, said tube being fused into a jacket, a humidifier for saturating the gas with said liquid and a conduit connecting said humidifier with the glass tube, means for maintaining the temperature of said glass tube constant, means for adjusting the temperature of said gas to the temperature of said glass tube, and means for vibrating the glass tube.

9. An apparatus for simultaneously equilibrating several liquid samples with the same gas comprising at least two containers for receiving each of the liquids to be equilibrated, each of said containers being provided with inlet openings for the liquid and being in communication with a second container through a cross-branch, the ends of which opening into one each of said two containers, an inlet opening in said cross-branch for the gas with which the liquids are to be equilibrated, means for maintaining the container walls at a constant temperature, means for adjusting the temperature of said gas to the temperature of said containers, means for withdrawing gas from said containers, and means for vibrating said containers.

10. An apparatus for simultaneously equilibrating several liquid samples with the same gas comprising two containers for receiving the liquids to be equilibrated, each of said containers being provided with inlet openings for the liquid and being in communication through a cross-branch, the ends of which opening into one each of said two containers, an inlet opening in said cross-branch for the gas with which the liquids are to be equilibrated, a humidifier for saturating the gas with said liquids, a conduit connecting said humidifier with the inlet opening of said cross-branch, means for adjusting the container walls and said gas to a desired temperature, means for withdrawing gas from said containers, and means for vibrating said containers.

11. The apparatus of claim 10 including in addition, at least one inlet for an additional gas and means to adjust the temperature of said additional gas to the temperature of the container, whereby a plurality of liquids may be simultaneously equilibrated with a plurality of different gases.

12. An apparatus according to claim 11 including, in addition, a temperature controlled water-bath within which the apparatus of claim 11 is disposed.

13. The apparatus of claim 12 including, in addition, an inlet to said water-bath disposed around the inlet of the gas to be equilibrated with a first liquid and an outlet from said water-bath disposed around a second inlet for a second gas stream to be equilibrated with a second liquid.

14. The apparatus of claim 5 wherein the means for vibrating the container comprises a motor, means to convert the rotary motion of said motor to an oscillatory motion, and means operatively connecting a support for said container to the oscillatory output of conversion means.

15. The apparatus of claim 14 including means for adjusting the amplitude of the oscillations of said container.

References Cited in the file of this patent

UNITED STATES PATENTS

| | | |
|---|---|---|
| 2,048,179 | Chandler | July 21, 1936 |
| 2,137,735 | Von Der Emde | Nov. 22, 1938 |
| 2,180,888 | Underwood | Nov. 21, 1939 |
| 2,356,530 | Pflock | Aug. 22, 1944 |
| 2,567,445 | Parker | Sept. 11, 1951 |
| 2,783,640 | Legatski et al. | Mar. 5, 1957 |
| 2,859,021 | Raub et al. | Nov. 4, 1958 |
| 2,880,070 | Gilbert et al. | Mar. 31, 1959 |
| 2,890,870 | Spiselman | June 16, 1959 |